United States Patent
Al-Yassir et al.

(10) Patent No.: US 10,519,384 B2
(45) Date of Patent: Dec. 31, 2019

(54) METHODS FOR PRODUCING ETHYLENE AND PROPYLENE FROM NAPHTHA

(71) Applicant: SABIC Global Technologies B.V., Bergen op Zoom (NL)

(72) Inventors: Nabil Al-Yassir, Riyadh (SA); Mohammed A. Siddiqui, Dhahran (SA); Mian Rahat Saeed, Dhahran (SA); Abdullah M. Aitani, Dhahran (SA); Sulaiman S. Al-Khattaf, Dhahran (SA); Ahmed S. Alzenaidi, Riyadh (SA); Vidya Sagar Guggilla, Bangalore (IN)

(73) Assignee: SABIC GLOBAL TECHNOLOGIES B.V., Bergen op Zoom (NL)

(*) Notice: Subject to any disclaimer, the term of this patent is extended or adjusted under 35 U.S.C. 154(b) by 0 days.

(21) Appl. No.: 16/061,592

(22) PCT Filed: Dec. 13, 2016

(86) PCT No.: PCT/IB2016/057582
§ 371 (c)(1),
(2) Date: Jun. 12, 2018

(87) PCT Pub. No.: WO2017/109640
PCT Pub. Date: Jun. 29, 2017

(65) Prior Publication Data
US 2018/0355259 A1    Dec. 13, 2018

Related U.S. Application Data

(60) Provisional application No. 62/270,722, filed on Dec. 22, 2015.

(51) Int. Cl.
*C10G 11/05* (2006.01)
*B01J 29/40* (2006.01)
(Continued)

(52) U.S. Cl.
CPC .......... *C10G 11/05* (2013.01); *B01J 29/405* (2013.01); *B01J 29/89* (2013.01); *C10G 9/36* (2013.01);
(Continued)

(58) Field of Classification Search
CPC ...... C10G 11/05; C10G 9/36; C10G 2400/20; B01J 29/405; B01J 29/89; B01J 2229/22; B01J 2229/38
See application file for complete search history.

(56) References Cited

U.S. PATENT DOCUMENTS

| | | | |
|---|---|---|---|
| 4,302,620 A | 11/1981 | Chu | 585/467 |
| 4,590,321 A * | 5/1986 | Chu | B01J 29/40 585/407 |

(Continued)

FOREIGN PATENT DOCUMENTS

| | | |
|---|---|---|
| CN | 101491772 B | 9/2011 |
| EP | 0050907 B1 | 11/1984 |

(Continued)

OTHER PUBLICATIONS

Full English Translation of CN101491772 B.*
International Search Report and Written Opinion from PCT/IB2016/057582, dated Mar. 30, 2017, 12 pages.

*Primary Examiner* — Youngsul Jeong
*Assistant Examiner* — Jason Y Chong
(74) *Attorney, Agent, or Firm* — Norton Rose Fulbright US LLP

(57) ABSTRACT

The presently disclosed subject matter relates to methods of producing ethylene and propylene by the catalytic steam cracking of naphtha using an HZSM-5 catalyst. An example method can include providing a naphtha feedstock, providing steam, and providing an HZSM-5 catalyst. The method can further include preparing the HZSM-5 catalyst by titanium modification or alkaline treatment, followed by phos- (Continued)

phorus modification. The method can further include feeding the naphtha feedstock and steam to a reactor containing the catalyst and removing an effluent from the reactor having a combined yield of ethylene and propylene of greater than about 45 wt-%.

16 Claims, 2 Drawing Sheets

(51) Int. Cl.
*C10G 9/36* (2006.01)
*B01J 29/89* (2006.01)

(52) U.S. Cl.
CPC ........ *B01J 2229/22* (2013.01); *B01J 2229/38* (2013.01); *C10G 2400/20* (2013.01)

(56) References Cited

U.S. PATENT DOCUMENTS

| | | | | |
|---|---|---|---|---|
| 6,548,725 | B2* | 4/2003 | Froment | B01J 29/061 |
| | | | | 585/407 |
| 6,835,863 | B2* | 12/2004 | Chester | C10G 35/095 |
| | | | | 208/120.01 |
| 2007/0010699 | A1 | 1/2007 | Choi et al. | 585/652 |
| 2007/0082809 | A1 | 4/2007 | Choi et al. | 502/214 |
| 2007/0209969 | A1 | 9/2007 | Shen et al. | 208/133 |
| 2013/0085311 | A1 | 4/2013 | Youn et al. | 585/651 |
| 2013/0317271 | A1* | 11/2013 | Al-Ghrami | B01J 38/00 |
| | | | | 585/653 |
| 2014/0296599 | A1 | 10/2014 | Nesterenko et al. | 585/468 |
| 2015/0367333 | A1* | 12/2015 | Wang | C07C 1/20 |
| | | | | 585/640 |

FOREIGN PATENT DOCUMENTS

| | | |
|---|---|---|
| EP | 0040900 B1 | 2/1985 |
| EP | 1117750 B1 | 6/2004 |
| WO | WO2011162717 A1 | 12/2011 |

* cited by examiner

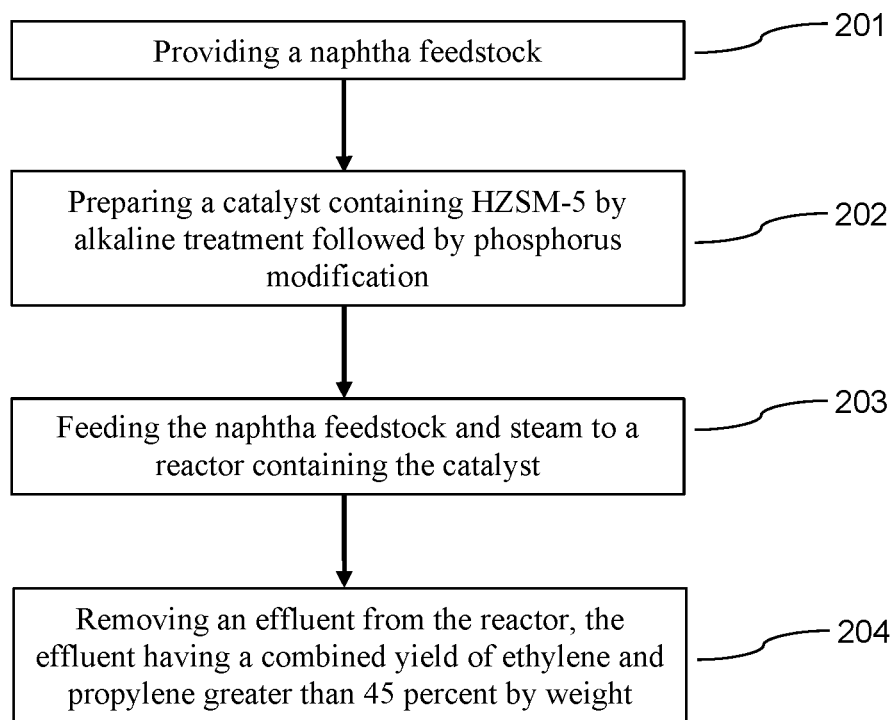

METHODS FOR PRODUCING ETHYLENE AND PROPYLENE FROM NAPHTHA

CROSS-REFERENCE TO RELATED APPLICATIONS

This application is a national phase application under 35 U.S.C. § 371 of International Application No. PCT/IB2016/057582 filed Dec. 13, 2016, which claims priority to U.S. Provisional Patent Application No. 62/270,722 filed Dec. 22, 2015. The entire contents of each of the above-referenced disclosures is specifically incorporated by reference herein without disclaimer.

FIELD

The presently disclosed subject matter relates to methods for producing ethylene and propylene from naphtha.

BACKGROUND

Naphtha can be a low value petrochemical stream found in petroleum distillate streams from oil refinery processes. Naphtha that is derived from the distillate of the crude still, i.e., straight run naphtha, can contain a variety of components, depending on the composition of the crude source. Straight run naphtha typically includes large amounts of straight and branched paraffins, and can further include olefins and/or aromatics.

As demand for petrochemical products grows, there is increased interest in converting low value naphtha streams into high value petrochemical products, including ethylene and propylene. Several technologies for producing light olefins, such as ethylene and propylene, are known in the art, for instance by fluid catalytic cracking (FCC), deep catalytic cracking (DCC), advanced catalytic olefins (ACO) processes, steam cracking, propane dehydrogenation, and olefin metathesis.

For example, European Patent No. 1117750 discloses a catalytic naphtha cracking process for producing olefins using a zeolite catalyst including phosphorus and a promoter metal. U.S. Patent Publication No. 2007/0082809 discloses hydrothermally stable porous molecular sieve catalysts, which can be used in catalytic cracking reactions, including producing light olefins from naphtha. U.S. Patent Publication No. 2007/0010699 discloses a process for producing light olefins from hydrocarbon feedstock using porous molecular sieve catalysts having a water-insoluble metal salt and a phosphate compound. International Patent Publication No. WO 2011/162717 discloses a method of producing alkenes by the dehydration of alcohols using a metal-modified zeolite. U.S. Patent Publication No. 2007/0209969 discloses a catalyst for use in cracking heavy feedstocks to produce lower olefins that can include an alkaline treated zeolite having a silica to alumina ratio of less than 45.

However, there remains a need for methods of producing high yields of ethylene and propylene from naphtha.

SUMMARY OF THE DISCLOSED SUBJECT MATTER

The presently disclosed subject matter provides methods for producing ethylene and propylene from naphtha using an HZSM-5 catalyst.

In certain embodiments, an exemplary method includes providing a naphtha feedstock and steam, providing a catalyst including phosphorus modified titanium-containing HZSM-5, feeding the naphtha feedstock and steam to a reactor containing the catalyst, and removing an effluent with a combined yield of ethylene and propylene greater than about 45 wt-% from the reactor.

In certain embodiments, the naphtha feedstock can include light straight run naphtha. The steam can be co-fed with the naphtha feedstock. The catalyst can have a $Si/Al_2$ ratio of about 27 to about 30. The catalyst can contain from about 1.0 wt-% to about 5.0 wt-% titanium (Ti) and from about 1.0 wt-% to about 10.0 wt-% phosphoric anhydride ($P_2O_5$). In certain embodiments, the catalyst is prepared by titanium modification followed by phosphorus modification. The phosphorus modification can use mono-ammonium phosphate.

In certain embodiments, six hours after first feeding the naphtha feedstock to the reactor, coke deposits on the catalyst can be less than about 5 wt-%. In certain embodiments, the catalyst is not steamed prior to feeding the naphtha feedstock to the reactor.

The presently disclosed subject matter also provides a method including providing a naphtha feedstock and steam, providing a catalyst including phosphorus modified mesoporous HZSM-5, feeding the naphtha feedstock and steam to a reactor containing the catalyst, and removing an effluent with a combined yield of ethylene and propylene greater than about 45 wt-% from the reactor.

In certain embodiments, the naphtha feedstock can include light straight run naphtha. The steam can be co-fed with the naphtha feedstock. The catalyst can have a $Si/Al_2$ ratio of about 27 to about 30. The catalyst can contain from about 1.0 wt-% to about 5.0 wt-% Ti and from about 1.0 wt-% to about 10.0 wt-% $P_2O_5$. The catalyst can be treated with 0.5M NaOH. The catalyst can be prepared by alkaline treatment followed by phosphorus modification. In certain embodiments, the phosphorus modification uses mono-ammonium phosphate. In certain embodiments, six hours after first feeding the naphtha feedstock to the reactor, coke deposits on the catalyst can be less than about 5 wt-%. In certain embodiments, the catalyst is not steamed prior to feeding the naphtha feedstock to the reactor.

BRIEF DESCRIPTION OF THE DRAWINGS

FIG. 2 depicts a method for producing ethylene and propylene from the catalytic steam cracking of naphtha according to another exemplary embodiment of the disclosed subject matter.

DETAILED DESCRIPTION

Figure 1:
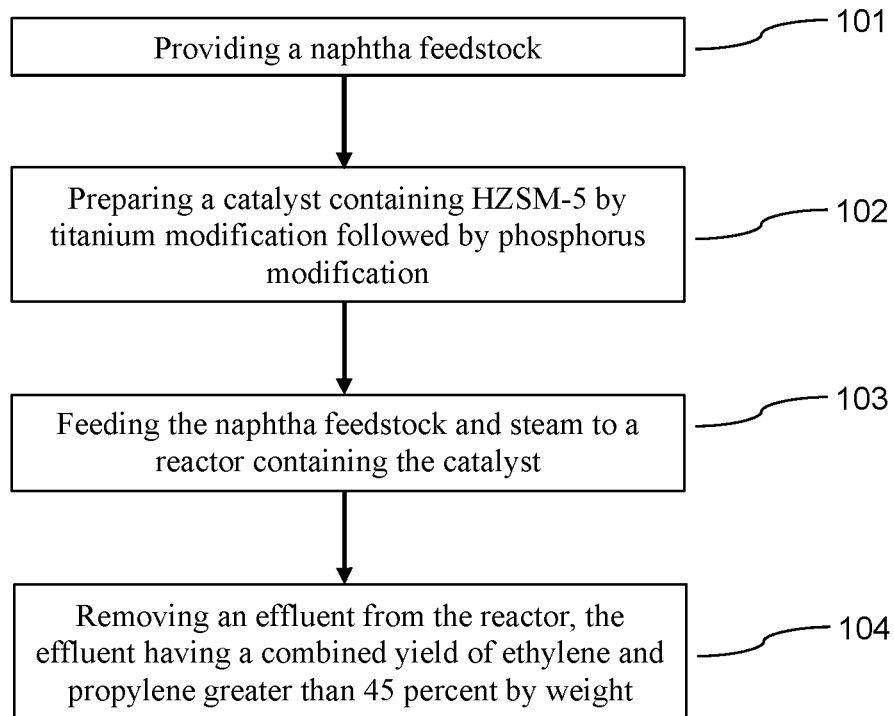
FIG. 1 depicts a method for producing ethylene and propylene from the catalytic steam cracking of naphtha according to one exemplary embodiment of the disclosed subject matter.

The presently disclosed subject matter provides methods for producing ethylene and propylene from naphtha. In certain embodiments, the presently disclosed subject matter relates to methods for the catalytic steam cracking of naphtha to light olefins, e.g., ethylene and propylene, using an HZSM-5 catalyst. For the purpose of illustration and not limitation, FIGS. 1 and 2 are schematic representations of methods according to non-limiting embodiments of the disclosed subject matter.

Referring to FIGS. 1 and 2, in certain embodiments, the method 100, 200 includes providing a naphtha feedstock 101, 201. Naphtha for use in the presently disclosed subject matter can originate from a variety of sources, including natural gas condensates, petroleum distillates, coal tar distillates, and/or peat. The naphtha for use in the presently disclosed subject matter can be light straight run naphtha.

In certain embodiments, the naphtha feedstock includes alkanes and iso-alkanes. The naphtha feedstock can also include other components, such as naphthenes and/or aromatics. For example, the naphtha feedstock can contain from about 20 wt-% to about 90 wt-%, from about 30 wt-% to about 80 wt-%, from about 40 wt-% to about 70 wt-%, or from about 50 wt-% to about 60 wt-% alkanes. The naphtha feedstock can contain from about 5 wt-% to about 75 wt-%, from about 15 wt-% to about 65 wt-%, from about 25 wt-% to about 55 wt-%, or from about 35 wt-% to about 45 wt-% iso-alkanes. The naphtha feedstock can contain less than about 10 wt-% naphthenes and less than about 2 wt-% aromatics.

As used herein, the term "about" or "approximately" means within an acceptable error range for the particular value as determined by one of ordinary skill in the art, which will depend in part on how the value is measured or determined, i.e., the limitations of the measurement system. For example, "about" can mean a range of up to 20%, up to 12%, up to 10%, up to 5%, and or up to 1% of a given value.

In certain embodiments, the initial boiling point of the naphtha feedstock is from about 30° C. to about 65° C., from about 40° C. to about 55° C., or from about 45° C. to about 50° C. The end boiling point of the naphtha feedstock can be from about 70° C. to about 130° C., from about 80° C. to about 110° C., or from about 85° C. to about 90° C. The saturated vapor pressure (at 20° C.) of the naphtha feedstock can be from about 50 kPa to about 90 kPa, from about 60 kPa to about 80 kPa, or from about 65 kPa to about 75 kPa.

In certain embodiments, the method 100, 200 further includes providing an HZSM-5 catalyst. The HZSM-5 catalyst can be a zeolite having a silica to alumina ratio (Si/Al$_2$) from about 10 to about 50, from about 20 to about 40, from about 25 to 35, or from about 27 to 30. The HZSM-5 catalyst can be mesoporous, i.e., can have pore diameters from about 2 to about 50 nanometers.

In certain non-limiting embodiments, the method 100 can include preparing a catalyst including HZSM-5 by titanium (Ti) modification 102. For example, the HZSM-5 catalyst can be prepared by treatment with a Ti compound. The Ti compound can be titanium tetrachloride, titanium oxychloride, titanium methoxide, titanium ethoxide, titanium iso-propoxide, titanium butoxide, or mixtures thereof. In particular embodiments, the Ti compound is titanium oxychloride. In certain embodiments, the Ti compound can be present in a solvent. Solvents for use in the presently disclosed methods can be any solvent suitable for dissolving a Ti compound. Such solvents include, but are not limited to, water, alcohols, organic sulfoxides or sulfones, carboxylic acids, and/or esters.

In certain embodiments, the Ti modified HZSM-5 catalyst is prepared by treating an HZSM-5 catalyst with a solution including a Ti compound. The method can further include removing the solvent from the Ti-modified HZSM-5 catalyst by filtration and/or evaporation. The method can further include calcinating the Ti-modified HZSM-5 catalyst. The Ti-modified HZSM-5 catalyst can contain from about 0.1 wt-% to about 20 wt-%, from about 0.5 wt-% to about 10 wt-%, or from about 1 wt-% to about 5 wt-% Ti. In particular embodiments, the HZSM-5 catalyst can contain about 2 wt-% Ti.

In other non-limiting embodiments, the method 200 can include preparing a catalyst including HZSM-5 by alkaline treatment 202. Alkaline treatment can result in increased mesoporosity and desilication of the HZSM-5 catalyst. The alkaline treatment can include preparing an alkaline solution with the HZSM-5 catalyst. The alkaline solution can contain NaOH. The NaOH can be present in the alkaline solution at a concentration from about 0.02 M to about 0.20 M. The method can further include removing the solvent from the alkaline treated HZSM-5 catalyst by filtration and/or evaporation. The method can further include calcinating the alkaline treated HZSM-5 catalyst.

In certain embodiments, Ti modification and/or alkaline treatment can be followed by phosphorus modification. For example, the method can include treating the HZSM-5 catalyst with a source of phosphate ions. The source of phosphate ions can be mono-ammonium phosphate. In certain embodiments, the method can include treating the HZSM-5 catalyst with a solution containing phosphate ions. The method can further include removing the solvent from the phosphorus modified HZSM-5 catalyst by filtration and/or evaporation. The method can further include calcinating the phosphorus modified HZSM-5 catalyst. The phosphorus modified HZSM-5 catalyst can contain from about 0.1 wt-% to about 20 wt-%, from about 0.5 wt-% to about 15 wt-%, or from about 1 wt-% to about 10 wt-% of a phosphorus oxide. The phosphorus oxide can be phosphoric anhydride ($P_2O_5$). In certain embodiments, the HZSM-5 catalyst contains about 5 wt-% $P_2O_5$.

It should be noted that in methods according to the disclosed subject matter, steaming of the HZSM-5 catalyst is not required prior to providing the catalyst to the reactor because the catalytic steam cracking is carried out in the presence of steam. Therefore, methods according to the presently disclosed subject matter can bypass the need for steaming and have improved efficiency as compared to certain other methods.

In certain embodiments, the method 100, 200 further includes feeding the naphtha feedstock to a reactor containing the catalyst 103, 203. The reactor can be any reactor type known to be suitable for the catalytic steam cracking of naphtha. For example, but not by way of limitation, the reactor can be a fixed bed reactor, such as a tubular fixed bed reactor or multi-tubular fixed bed reactor, fluidized bed reactor, such as an entrained fluidized bed reactor or a fixed fluidized bed reactor, or a slurry bed reactor, such as three-phase slurry bubble columns or an ebullated bed reactor. The dimensions and structure of the reactor of the presently disclosed subject matter can vary depending on the capacity of the reactor. The capacity of the reactor can be determined by the reaction rate, the stoichiometric quantities of the reactants and/or the feed flow rate.

In certain embodiments, the method further includes the catalytic steam cracking of naphtha to form ethylene and propylene. The method can include providing steam to the reactor. The ratio of steam to naphtha provided to the reactor can be from about 0.25 to about 0.75, from about 0.35 to about 0.65, or from about 0.4 to about 0.6. In particular embodiments, the ratio of steam to naphtha fed to the reactor is about 0.5. The reaction can be carried out at a temperature from about 400° C. to about 900° C., from about 500° C. to about 800° C., from about 550° C. to about 750° C., or from about 600° C. to about 700° C. The reaction can be carried out at a pressure from about atmospheric pressure to about 30 psig. The reaction can be carried out at a weight hourly space velocity of about 5 to about 7 per hour naphtha feedstock.

In certain embodiments, the method 100, 200 further includes removing an effluent from the reactor 104, 204. The effluent can contain ethylene and propylene. For example, the effluent can contain from about 5 wt-% to about 35 wt-%, from about 10 wt-% to about 30 wt-%, or from about 15 wt-% to about 25 wt-% ethylene. The effluent can contain from about 10 wt-% to about 50 wt-%, from about 20 wt-% to about 40 wt-%, or from about 25 wt-% to about 35 wt-% propylene. The effluent can further include other components, such as higher olefins, paraffins, and/or aromatics, e.g., benzene, toluene, and/or xylene. For example, the effluent can contain from about 5 wt-% to about 10 wt-% higher olefins, from about 0.1 wt-% to about 5 wt-% aromatics, from about 20 wt-% to about 30 wt-% $C_1$ to $C_4$ alkanes, and/or from about 15 wt-% to about 30 wt-% higher alkanes.

In certain embodiments, the combined yield of ethylene and propylene in the effluent is greater than about 30 wt-%, greater than about 35 wt-%, greater than about 40 wt-%, or greater than about 45 wt-%.

The methods of the presently disclosed subject matter can provide advantages over certain existing technologies. Exemplary advantages include eliminating catalyst steaming prior to use, superior time-on-stream stability, and high ethylene and propylene yield.

The following examples are merely illustrative of the presently disclosed subject matter and should not be considered as a limitation in any way.

EXAMPLES

Example 1: Naphtha Feedstock

The catalytic steam cracking of light straight run naphtha to light olefins was carried out over a series of catalysts (Examples 2 through 9 below).

The catalytic steam cracking was carried out at a reaction temperature of 650° C. with a time-on-stream (TOS) of 6 hours. The ratio of steam to naphtha in the feed was 0.5. The reaction had a weight hourly space velocity (WHSV) of about 6.1 $h^{-1}$. Table 1 displays the physical properties of the naphtha feedstock.

TABLE 1

Physical properties of light straight run naphtha.

| Density (20° C.) kg/m³ | 657 |
|---|---|
| Boiling Range | |
| Initial Boiling Point, ° C. | 48.3 |
| End Boiling Point, ° C. | 88.4 |
| Saturated vapor pressure (20° C.) KPa | 70.4 |
| Chemical Composition (wt-%) | |
| Alkane | 55.7 |
| Iso-alkane | 39.3 |
| Naphthenes | 4.70 |
| Aromatics | 0.30 |

Example 2: Unmodified HZSM-5 Catalysts

Commercial HZSM-5 (Zeolyst, $NH_4$ form, CBV3024E) having a Si/$Al_2$ ratio of 27 was calcined at 550° C. with a heating rate of 3° C. per minute and a holding time of 5 hours. Table 2 displays the catalytic performance of unmodified HZSM-5 in the catalytic steam cracking process of Example 1.

TABLE 2

Catalytic performance of unmodified HZSM-5 catalysts.

| Steam/Naphtha, feed ratio | 0.50 |
|---|---|
| WHSV, h-1 | 6.00 |
| Mass Balance | 98.3 |
| Conversion (LPG + Dry Gas + Coke), wt-% | 77.5 |
| Yields, wt-% | |
| C3= + C2= | 44.5 |
| C3= | 26.5 |
| C2= | 18.1 |
| C2=/C3= ratio | 0.67 |
| C4= | 6.49 |
| C5= | 1.23 |
| BTX | 1.79 |
| Benzene | 1.73 |
| Toluene | 0.00 |
| Xylenes | 0.00 |
| C1-C4 alkanes | 23.5 |
| C1 | 5.99 |
| C2 | 8.29 |
| C3 | 7.66 |
| C4 | 1.52 |
| C4+ | 21.4 |
| C5 | 12.3 |
| C6 | 9.10 |
| Others | 0.32 |
| H2 | 0.74 |
| Total | 99.9 |
| Selectivity, wt-% | |
| C3= + C2= | 57.5 |
| Propylene | 34.2 |
| Ethylene | 23.2 |
| BTX | 2.31 |

Example 3: Titanium Added and Alkaline Treated HZSM-5 Catalysts

Ti/HZSM-5 Catalysts 1.0 g of HZSM-5 zeolite having a Si/$Al_2$ ratio of 27 was stirred in a solution containing a Ti precursor (titanium oxychloride). The amount of titanium oxychloride in the solution was calibrated to produce a metal loading of 2.0 wt-%. The mixture was stirred for 3 hours. The solvent was removed by filtration. The product was then dried at 90° C. overnight followed by calcination at 650° C. (heating rate of 3° C. per minute, holding time of 5 hours).

Alkaline Treated HZSM-5 Catalysts 60 mL of alkaline NaOH solution of 0.05 M was heated to about 65° C. to about 75° C. in a flask connected to a reflux and water bath. 1.0 g of HZSM-5 zeolite having a Si/$Al_2$ ratio of 30 was added to the heated solution, and the solution was stirred at a constant temperature for 2 hours. The zeolite suspension was immediately cooled in an ice bath, and was subsequently isolated by suction filtration. The product was washed thoroughly with deionized water to a neutral pH. It was then dried at ambient temperature, followed by drying at 110° C. overnight. The samples were calcined in static air at 550° C. (heating rate of 3° C. per minute, holding time of 5 hours). The $Na^+$-containing zeolites were transformed into ammonium form by two-fold ion-exchange with 2.20 M of $NH_4Cl$ at 80° C. for 5 hours without calcination between the ion-exchange procedures. The ion-exchange was carried out at a concentration of 1.0 g zeolite per 50 mL $NH_4Cl$ solution. The samples were then subjected to drying treatments followed by calcination to produce the H-form.

Table 3 displays the catalytic performance of Ti/HZSM-5 and alkaline treated HZSM-5 compared to the unmodified HZSM-5 of Example 2 after undergoing the catalytic steam cracking process of Example 1.

TABLE 3

Catalytic performance of Ti/HZSM-5, alkaline treated HZSM-5, and unmodified HZSM-5 catalysts.

| Catalyst | Unmodified HZSM-5 (Example 2) | Alkaline Treated HZSM-5 | Ti/ HZSM-5 |
|---|---|---|---|
| Steam/Naphtha, feed ratio | 0.50 | 0.5 | 0.5 |
| WHSV, h$^{-1}$ | 6.00 | 6.10 | 6.10 |
| Mass Balance | 98.3 | 101 | 98.7 |
| Conversion (LPG + Dry Gas + Coke), wt-% | 77.5 | 79.7 | 77.3 |
| Yields, wt-% | | | |
| $C_3^=$ + $C_2^=$ | 44.5 | 47.1 | 46.0 |
| $C_3^=$ | 26.5 | 28.0 | 28.2 |
| $C_2^=$ | 18.1 | 19.1 | 17.8 |
| $C_2^=/C_3^=$ ratio | 0.67 | 0.70 | 0.63 |
| $C_4^=$ | 6.49 | 6.70 | 6.99 |
| $C_5^=$ | 1.23 | 1.20 | 1.26 |
| BTX | 1.79 | 1.60 | 1.43 |
| Benzene | 1.73 | 1.60 | 1.43 |
| Toluene | 0.00 | 0.00 | 0.00 |
| Xylenes | 0.00 | 0.00 | 0.00 |
| $C_1$-$C_4$ alkanes | 23.5 | 23.0 | 21.7 |
| $C_1$ | 5.99 | 6.10 | 5.72 |
| $C_2$ | 8.29 | 8.00 | 7.64 |
| $C_3$ | 7.66 | 7.50 | 6.94 |
| $C_4$ | 1.52 | 1.50 | 1.39 |
| $C_4^+$ | 21.4 | 19.2 | 21.6 |
| $C_5$ | 12.3 | 10.9 | 12.9 |
| $C_6$ | 9.10 | 8.20 | 8.73 |
| Others | 0.32 | 0.30 | 0.36 |
| $H_2$ | 0.74 | 0.80 | 0.72 |
| Total | 99.9 | 100 | 100 |
| Selectivity, wt-% | | | |
| $C_3^=$ + $C_2^=$ | 57.5 | 59.1 | 59.5 |
| Propylene | 34.2 | 35.2 | 36.5 |
| Ethylene | 23.2 | 24.0 | 23.0 |
| BTX | 2.31 | 2.00 | 1.83 |

As demonstrated by the data in Table 3, titanium modified and alkaline treated HZSM-5 catalysts in accordance with the disclosed subject matter provide improved combined yields of ethylene and propylene compared to unmodified HZSM-5 catalysts. Further, titanium modification and alkaline treatment provide improved conversion of naphtha compared to unmodified HZSM-5 catalysts.

Example 4: Phosphorus Modified HZSM-5 Catalysts

A slurry was prepared containing 35 wt-% of the solid unmodified HZSM-5 of Example 2. Mono-ammonium phosphate (MAP) was added to the slurry such that the slurry contained 5 wt-% $P_2O_5$. The solution was heated to 95° C. with continuous stirring for 1 hour. Water was then removed by slow evaporation. The product was dried at 90° C. overnight followed by calcination at 650° C. (heating rate of 3° C. per minute, holding time of 3 hours). Table 4 displays the catalytic performance of the phosphorus modified HZSM-5 compared to the unmodified HZSM-5 of Example 2 after undergoing the catalytic steam cracking process of Example 1.

TABLE 4

Catalytic performance of unmodified HZSM-5 and HZSM-5-$P_2O_5$ catalysts.

| Catalyst | Unmodified HZSM-5 (Example 2) | HZSM-5-$P_2O_5$ |
|---|---|---|
| Steam/Naphtha, feed ratio | 0.50 | 0.50 |
| WHSV, h-1 | 6.00 | 6.00 |
| Mass Balance | 98.3 | 100 |
| Conversion (LPG + Dry Gas + Coke), wt-% | 77.5 | 72.5 |
| Yields, wt-% | | |
| C3= + C2= | 44.5 | 42.6 |
| C3= | 26.5 | 26.4 |
| C2= | 18.1 | 16.2 |
| C2=/C3= ratio | 0.67 | 0.60 |
| C4= | 6.49 | 6.90 |
| C5= | 1.23 | 1.30 |
| BTX | 1.79 | 1.70 |
| Benzene | 1.73 | 1.71 |
| Toluene | 0.00 | 0.00 |
| Xylenes | 0.00 | 0.00 |
| C1-C4 alkanes | 23.5 | 20.0 |
| C1 | 5.99 | 5.40 |
| C2 | 8.29 | 7.50 |
| C3 | 7.66 | 5.90 |
| C4 | 1.52 | 1.20 |
| C4+ | 21.4 | 26.4 |
| C5 | 12.3 | 14.5 |
| C6 | 9.10 | 11.9 |
| Others | 0.32 | 0.30 |
| H2 | 0.74 | 0.70 |
| Total | 99.9 | 100 |
| Selectivity, wt-% | | |
| C3= + C2= | 57.5 | 58.7 |
| Propylene | 34.2 | 36.4 |
| Ethylene | 23.2 | 22.3 |
| BTX | 2.31 | 1.61 |

As demonstrated by the data in Table 4, phosphorus modification of HZSM-5 catalysts alone does not provide an improved combined yield of ethylene and propylene compared to unmodified HZSM-5 catalysts. Further, phosphorus modification alone does not provide improved conversion of naphtha compared to unmodified HZSM-5 catalysts.

Example 5: Phosphorus Modified Alkaline Treated HZSM-5 Catalysts

A slurry was prepared containing 35 wt-% of the solid alkaline treated HZSM-5 of Example 3. Mono-ammonium phosphate (MAP) was added to the slurry such that the slurry contained 5 wt-% $P_2O_5$. The solution was heated to 95° C. with continuous stirring for 1 hour. Water was then removed by slow evaporation. The product was dried at 90° C. overnight followed by calcination at 650° C. (heating rate of 3° C. per minute, holding time of 3 hours). Table 5 displays the catalytic performance of the phosphorus modified alkaline treated HZSM-5 compared to the alkaline treated HZSM-5 of Example 3 after undergoing the catalytic steam cracking process of Example 1.

TABLE 5

Catalytic performance of alkaline treated HZSM-5 and alkaline treated HZSM-5-$P_2O_5$ catalysts.

| Catalyst | Alkaline Treated HZSM-5 (Example 3) | Alkaline Treated HZSM-5-$P_2O_5$ |
|---|---|---|
| Steam/Naphtha, feed ratio | 0.50 | 0.50 |
| WHSV, $h^{-1}$ | 6.10 | 6.20 |
| Mass Balance | 101 | 102 |
| Conversion (LPG + Dry Gas + Coke), wt-% | 79.7 | 90.9 |
| Yields, wt-% | | |
| $C_3^= + C_2^=$ | 47.1 | 51.9 |
| $C_3^=$ | 28.0 | 27.9 |
| $C_2^=$ | 19.1 | 24.0 |
| $C_2^=/C_3^=$ ratio | 0.70 | 0.87 |
| $C_4^=$ | 6.70 | 6.19 |
| $C_5^=$ | 1.20 | 1.28 |
| BTX | 1.60 | 3.11 |
| Benzene | 1.60 | 2.26 |
| Toluene | 0.00 | 0.39 |
| Xylenes | 0.00 | 0.45 |
| $C_1$-$C_4$ alkanes | 23.0 | 28.5 |
| $C_1$ | 6.10 | 7.95 |
| $C_2$ | 8.00 | 10.5 |
| $C_3$ | 7.50 | 8.73 |
| $C_4$ | 1.50 | 1.33 |
| $C_4^+$ | 19.2 | 7.64 |
| $C_5$ | 10.9 | 4.85 |
| $C_6$ | 8.20 | 2.80 |
| Others | 0.30 | 0.30 |
| $H_2$ | 0.80 | 1.00 |
| Total | 100 | 99.9 |
| Selectivity, wt-% | | |
| $C_3^= + C_2^=$ | 59.1 | 57.1 |
| Propylene | 35.2 | 30.7 |
| Ethylene | 24.0 | 26.4 |
| BTX | 2.00 | 2.88 |

As demonstrated by the data in Table 5, phosphorus modification of alkaline treated HZSM-5 catalysts in accordance with the disclosed subject matter provides improved combined yields of ethylene and propylene compared to alkaline treated HZSM-5 catalysts. Further, phosphorus modification provides improved conversion of naphtha compared to alkaline treated HZSM-5 catalysts.

Example 6: Phosphorus Modified Ti/HZSM-5 Catalysts

A slurry was prepared containing 35 wt-% of the solid Ti/HZSM-5 of Example 3. Mono-ammonium phosphate (MAP) was added to the slurry such that the slurry contained 5 wt-% $P_2O_5$. The solution was heated to 95° C. with continuous stirring for 1 hour. Water was then removed by slow evaporation. The product was dried at 90° C. overnight followed by calcination at 650° C. (heating rate of 3° C. per minute, holding time of 3 hours).

Table 6 displays the catalytic performance of the phosphorus modified Ti/HZSM-5 compared to the Ti/HZSM-5 of Example 3 after undergoing the catalytic steam cracking process of Example 1.

TABLE 6

Catalytic performance of Ti/HZSM-5 and Ti/HZSM-5-$P_2O_5$ catalysts.

| Catalyst | Ti/HZSM-5 (Example 3) | Ti/HZSM-5-$P_2O_5$ |
|---|---|---|
| Steam/Naphtha, feed ratio | 0.50 | 0.50 |
| WHSV, $h^{-1}$ | 6.10 | 6.15 |
| Mass Balance | 98.7 | 100 |
| Conversion (LPG + Dry Gas + Coke), wt-% | 77.3 | 81.5 |
| Yields, wt-% | | |
| $C_3^= + C_2^=$ | 46.0 | 48.0 |
| $C_3^=$ | 28.2 | 29.6 |
| $C_2^=$ | 17.8 | 18.4 |
| $C_2^=/C_3^=$ ratio | 0.63 | 0.62 |
| $C_4^=$ | 6.99 | 7.64 |
| $C_5^=$ | 1.26 | 1.38 |
| BTX | 1.43 | 1.32 |
| Benzene | 1.43 | 1.32 |
| Toluene | 0.00 | 0.00 |
| Xylenes | 0.00 | 0.00 |
| $C_1$-$C_4$ alkanes | 21.7 | 23.2 |
| $C_1$ | 5.72 | 5.64 |
| $C_2$ | 7.64 | 8.58 |
| $C_3$ | 6.94 | 7.49 |
| $C_4$ | 1.39 | 1.46 |
| $C_4^+$ | 21.6 | 17.4 |
| $C_5$ | 12.9 | 10.9 |
| $C_6$ | 8.73 | 6.52 |
| Others | 0.36 | 0.34 |
| $H_2$ | 0.72 | 0.72 |
| Total | 100 | 100 |
| Selectivity, wt-% | | |
| $C_3^= + C_2^=$ | 59.5 | 58.9 |
| Propylene | 36.5 | 36.3 |
| Ethylene | 23.0 | 22.6 |
| BTX | 1.83 | 1.61 |

As demonstrated by the data in Table 6, phosphorus modification of Ti/HZSM-5 catalysts in accordance with the disclosed subject matter provides improved combined yields of ethylene and propylene compared to Ti/HZSM-5 catalysts. Further, phosphorus modification provides improved conversion of naphtha compared to Ti/HZSM-5 catalysts.

Example 7: Steamed HZSM-5 and HZSM-5-$P_2O_5$ Catalysts 1.0 g of the unmodified HZSM-5 of Example 2 was subjected to steam at 700° C. for 3 hours (100% steam, heating rate of 10° C. per minute). The steamed catalysts were dried overnight at 100° C. 1.0 g of the phosphorus modified HZSM-5-$P_2O_5$ of Example 4 was also subjected to steam and dried in the same manner. Table 7 displays the catalytic performance of the steamed HZSM-5 and steamed HZSM-5-$P_2O_5$ compared to the unmodified HZSM-5 of Example 2 and the HZSM-5-$P_2O_5$ of Example 4 after undergoing the catalytic steam cracking process of Example 1.

TABLE 7

Catalytic performance of steamed and unsteamed HZSM-5 and HZSM-5-$P_2O_5$ catalysts.

| Catalyst | Unmodified HZSM-5 (Example 2) | Steamed HZSM-5 | HZSM-5-$P_2O_5$ (Example 4) | Steamed HZSM-5-$P_2O_5$ |
|---|---|---|---|---|
| Steam/Naphtha, feed ratio | 0.50 | 0.51 | 0.50 | 0.50 |
| WHSV, $h^{-1}$ | 6.00 | 6.03 | 6.00 | 6.20 |
| Mass Balance | 98.3 | 103 | 100 | 97.6 |
| Conversion (LPG + Dry Gas + Coke), wt-% | 77.5 | 65.1 | 72.5 | 85.5 |
| Yields, wt-% | | | | |
| $C_3^= + C_2^=$ | 44.5 | 38.9 | 42.6 | 48.3 |
| $C_3^=$ | 26.5 | 25.5 | 26.4 | 26.9 |
| $C_2^=$ | 18.1 | 13.4 | 16.2 | 21.4 |
| $C_2^=/C_3^=$ ratio | 0.67 | 0.53 | 0.60 | 0.80 |
| $C_4^=$ | 6.49 | 6.95 | 6.90 | 6.18 |
| $C_5^=$ | 1.23 | 1.23 | 1.30 | 1.27 |
| BTX | 1.79 | 1.19 | 1.70 | 2.36 |
| Benzene | 1.73 | 1.19 | 1.70 | 2.28 |
| Toluene | 0.00 | 0.00 | 0.00 | 0.05 |
| Xylenes | 0.00 | 0.00 | 0.00 | 0.03 |
| $C_1$-$C_4$ alkanes | 23.5 | 16.9 | 20.0 | 27.4 |
| $C_1$ | 5.99 | 4.19 | 5.40 | 7.56 |
| $C_2$ | 8.29 | 6.11 | 7.50 | 9.76 |
| $C_3$ | 7.66 | 5.43 | 5.90 | 8.66 |
| $C_4$ | 1.52 | 1.16 | 1.20 | 1.45 |
| $C_4^+$ | 21.4 | 33.9 | 26.4 | 13.1 |
| $C_5$ | 12.3 | 19.3 | 14.5 | 7.71 |
| $C_6$ | 9.10 | 14.6 | 11.9 | 5.41 |
| Others | 0.32 | 0.37 | 0.30 | 0.34 |
| $H_2$ | 0.74 | 0.52 | 0.70 | 0.94 |
| Total | 99.9 | 100 | 100 | 100 |
| Selectivity, wt-% | | | | |
| $C_3^= + C_2^=$ | 57.5 | 59.7 | 58.7 | 56.5 |
| Propylene | 34.2 | 39.1 | 36.4 | 31.5 |
| Ethylene | 23.2 | 20.6 | 22.6 | 25.0 |
| BTX | 2.31 | 1.83 | 1.61 | 2.76 |

As demonstrated by the data in Table 7, steaming HZSM-5 catalysts prior to the catalytic steam cracking reaction unexpectedly does not consistently improve combined yields of ethylene and propylene or conversion of naphtha compared to unsteamed HZSM-5 catalysts.

Example 8: Steamed Alkaline Treated HZSM-5 and HZSM-5-$P_2O_5$ Catalysts 1.0 g of the alkaline treated HZSM-5 of Example 3 was subjected to steam at 700° C. for 3 hours (100% steam, heating rate of 10° C. per minute). The steamed catalysts were dried overnight at 100° C. 1.0 g of the phosphorus modified alkaline treated HZSM-5-$P_2O_5$ of Example 5 was also subjected to steam and dried in the same manner. Table 8 displays the catalytic performance of the steamed alkaline treated HZSM-5 and steamed alkaline treated HZSM-5-$P_2O_5$ compared to the alkaline treated HZSM-5 of Example 3 and the alkaline treated HZSM-5-$P_2O_5$ of Example 5 after undergoing the catalytic steam cracking process of Example 1.

TABLE 8

Catalytic performance of steamed and unsteamed alkaline treated HZSM-5 and HZSM-5-$P_2O_5$ catalysts.

| Catalyst | Alkaline Treated HZSM-5 (Example 3) | Steamed Alkaline Treated HZSM-5 | Alkaline Treated HZSM-5-$P_2O_5$ (Example 5) | Steamed Alkaline Treated HZSM-5-$P_2O_5$ |
|---|---|---|---|---|
| Steam/Naphtha, feed ratio | 0.50 | 0.50 | 0.50 | 0.50 |
| WHSV, $h^{-1}$ | 6.10 | 6.20 | 6.20 | 6.10 |
| Mass Balance | 101 | 104 | 102 | 99.3 |
| Conversion (LPG + Dry Gas + Coke), wt-% | 79.7 | 48.3 | 90.9 | 86.1 |
| Yields, wt-% | | | | |
| $C_3^= + C_2^=$ | 47.1 | 28.5 | 51.9 | 47.4 |
| $C_3^=$ | 28.0 | 19.2 | 27.9 | 25.6 |
| $C_2^=$ | 19.1 | 9.28 | 24.0 | 21.8 |
| $C_2^=/C_3^=$ ratio | 0.70 | 0.48 | 0.87 | 0.86 |
| $C_4^=$ | 6.70 | 5.87 | 6.19 | 5.80 |
| $C_5^=$ | 1.20 | 1.31 | 1.28 | 1.18 |
| BTX | 1.60 | 1.66 | 3.11 | 2.90 |
| Benzene | 1.60 | 1.12 | 2.26 | 2.81 |
| Toluene | 0.00 | 0.32 | 0.39 | 0.06 |
| Xylenes | 0.00 | 0.22 | 0.45 | 0.04 |
| $C_1$-$C_4$ alkanes | 23.0 | 11.0 | 28.5 | 28.8 |
| $C_1$ | 6.10 | 3.03 | 7.95 | 8.97 |
| $C_2$ | 8.00 | 4.18 | 10.5 | 10.8 |
| $C_3$ | 7.50 | 3.09 | 8.73 | 7.95 |
| $C_4$ | 1.50 | 0.70 | 1.33 | 1.12 |
| $C_4^+$ | 19.2 | 50.9 | 7.64 | 12.5 |
| $C_5$ | 10.9 | 25.6 | 4.85 | 6.99 |
| $C_6$ | 8.20 | 25.3 | 2.80 | 5.51 |
| Others | 0.30 | 0.36 | 0.30 | 0.28 |
| $H_2$ | 0.80 | 0.38 | 1.00 | 1.00 |
| Total | 100.0 | 99.9 | 99.9 | 100 |
| Selectivity, wt-% | | | | |
| $C_3^= + C_2^=$ | 59.1 | 58.92 | 57.1 | 55.1 |
| Propylene | 35.2 | 39.71 | 30.7 | 29.7 |
| Ethylene | 24.0 | 19.21 | 26.4 | 25.4 |
| BTX | 2.00 | 3.44 | 2.88 | 3.37 |

As demonstrated by the data in Table 8, steaming alkaline treated HZSM-5 catalysts prior to the catalytic steam cracking reaction unexpectedly does not improve combined yields of ethylene and propylene or conversion of naphtha compared to unsteamed alkaline treated HZSM-5 catalysts.

Example 9: Steamed Ti/HZSM-5 and Ti/HZSM-5-$P_2O_5$ Catalysts 1.0 g of the Ti/HZSM-5 of Example 3 was subjected to steam at 700° C. for 3 hours (100% steam, heating rate of 10° C. per minute). The steamed catalysts were dried overnight at 100° C. 1.0 g of the phosphorus modified Ti/HZSM-5-P2O5 of Example 6 was also subjected to steam and dried in the same manner. Table 9 displays the catalytic performance of the steamed Ti/HZSM-5 and steamed Ti/HZSM-5-P2O5 compared to the Ti/HZSM-5 of Example 3 and the Ti/HZSM-5-P2O5 of Example 6 after undergoing the catalytic steam cracking process of Example 1.

TABLE 9

Catalytic performance of steamed and unsteamed Ti/HZSM-5 and Ti/HZSM-5-P$_2$O$_5$ catalysts.

| Catalyst | Ti/HZSM-5 (Example 3) | Steamed Ti/HZSM-5 | Ti/HZSM-5-P$_2$O$_5$ (Example 5) | Steamed Ti/HZSM-5-P$_2$O$_5$ |
|---|---|---|---|---|
| Steam/Naphtha, feed ratio | 0.50 | 0.49 | 0.50 | 0.50 |
| WHSV, h$^{-1}$ | 6.10 | 6.22 | 6.15 | 6.20 |
| Mass Balance | 98.7 | 101 | 100 | 104 |
| Conversion (LPG + Dry Gas + Coke), wt-% | 77.3 | 55.9 | 81.5 | 81.1 |
| Conversion | | | | |
| Yields, wt-% | | | | |
| C$_3^=$ + C$_2^=$ | 46.0 | 33.3 | 48.0 | 48.0 |
| C$_3^=$ | 28.2 | 22.5 | 29.6 | 29.6 |
| C$_2^=$ | 17.8 | 10.8 | 18.4 | 18.4 |
| C$_2^=$/C$_3^=$ ratio | 0.63 | 0.48 | 0.62 | 0.62 |
| C$_4^=$ | 6.99 | 6.57 | 7.64 | 7.69 |
| C$_5^=$ | 1.26 | 1.29 | 1.38 | 1.39 |
| BTX | 1.43 | 1.12 | 1.32 | 1.31 |
| Benzene | 1.43 | 1.08 | 1.32 | 1.31 |
| Toluene | 0.00 | 0.03 | 0.00 | 0.00 |
| Xylenes | 0.00 | 0.02 | 0.00 | 0.00 |
| C$_1$-C$_4$ alkanes | 21.7 | 13.7 | 23.2 | 22.7 |
| C$_1$ | 5.72 | 3.59 | 5.64 | 5.49 |
| C$_2$ | 7.64 | 5.02 | 8.58 | 8.29 |
| C$_3$ | 6.94 | 4.20 | 7.49 | 7.44 |
| C$_4$ | 1.39 | 0.92 | 1.46 | 1.45 |
| C$_4^+$ | 21.6 | 43.2 | 17.4 | 17.9 |
| C$_5$ | 12.9 | 24.1 | 10.9 | 10.9 |
| C$_6$ | 8.73 | 19.1 | 6.52 | 6.89 |
| Others | 0.36 | 0.38 | 0.34 | 0.36 |
| H$_2$ | 0.72 | 0.45 | 0.72 | 0.69 |
| Total | 100 | 100 | 100 | 100 |
| Selectivity, wt-% | | | | |
| C$_3^=$ + C$_2^=$ | 59.5 | 59.4 | 58.9 | 59.2 |
| Propylene | 36.5 | 40.1 | 36.3 | 36.6 |
| Ethylene | 23.0 | 19.3 | 22.6 | 22.7 |
| BTX | 1.83 | 2.01 | 1.61 | 1.60 |

As demonstrated by the data in Table 9, steaming Ti/HZSM-5 catalysts prior to the catalytic steam cracking reaction unexpectedly does not improve combined yields of ethylene and propylene or conversion of naphtha compared to unsteamed Ti/HZSM-5 catalysts.

Example 10: Coke Deposits on HZSM-5 Catalysts

The catalytic steam cracking of light straight run naphtha to light olefins was carried out over a series of catalysts (Examples 2 through 9 above). Table 10 displays the coke deposits (carbonaceous deposits) on the surface of the catalysts of Examples 2 through 9 after 6 hours of the catalytic steam cracking process of Example 1.

TABLE 10

Coke deposits on catalysts of Examples 1 through 9.

| Catalyst | Wt-% of Coke (based on the weight of the spent catalyst) |
|---|---|
| Example 2: Unmodified HZSM-5 | 5.41 |
| Example 3: Alkaline Treated HZSM-5 | 6.68 |
| Example 3: Ti/HZSM-5 | 7.11 |
| Example 4: HZSM-5-P$_2$O$_5$ | 3.39 |
| Example 5: Alkaline Treated HZSM-5-P$_2$O$_5$ | 4.32 |
| Example 6: Ti/HZSM-5-P$_2$O$_5$ | 3.88 |
| Example 7: Steamed HZSM-5 | 4.72 |
| Example 7: Steamed HZSM-5-P$_2$O$_5$ | 4.78 |
| Example 8: Steamed Alkaline Treated HZSM-5 | 6.31 |
| Example 8: Steamed Alkaline Treated HZSM-5-P$_2$O$_5$ | 4.11 |
| Example 9: Steamed Ti-HZSM-5 | 4.52 |
| Example 9: Steamed Ti-HZSM-5-P$_2$O$_5$ | 3.41 |

As demonstrated by the data in Table 10, phosphorus modification in accordance with the disclosed subject matter provides reduced coke deposits after six hours of catalytic steam cracking. Phosphorus modified HZSM-5 catalysts showed less coke deposits by weight percent compared to unmodified HZSM-5 catalysts. Phosphorus modified alkaline treated HZSM-5 catalysts showed less coke deposits by weight percent compared to alkaline treated HZSM-5 catalysts. Phosphorus modified Ti/HZSM-5 catalysts showed less coke deposits by weight percent compared to Ti/HZSM-5 catalysts.

In addition to the various embodiments depicted and claimed, the disclosed subject matter is also directed to other embodiments having other combinations of the features disclosed and claimed herein. As such, the particular features presented herein can be combined with each other in other manners within the scope of the disclosed subject matter such that the disclosed subject matter includes any suitable combination of the features disclosed herein. The foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the systems and methods of the disclosed subject matter without departing from the spirit or scope of the disclosed subject matter. Thus, it is intended that the disclosed subject matter include modifications and variations that are within the scope of the appended claims and their equivalents.

Various patents and patent applications are cited herein, the contents of which are hereby incorporated by reference herein in their entireties.

The invention claimed is:

1. A method for producing ethylene and propylene from catalytic steam cracking of naphtha, the method comprising:
    (a) providing a naphtha feedstock;
    (b) providing steam;
    (c) providing a catalyst consisting of phosphorus modified Ti-containing HZSM-5;
    (d) feeding the naphtha feedstock and the steam to a reactor comprising the catalyst, thereby producing an effluent comprising ethylene and propylene; and (e) removing the effluent from the reactor, the effluent having a combined yield of ethylene and propylene greater than about 45 percent by weight;
wherein the catalyst comprises from about 1.0 to about 10.0 percent by weight $P_2O_5$, and
wherein the catalyst comprises from about 1.0 to about 5.0 percent by weight Ti.

2. The method of claim 1, wherein the naphtha feedstock comprises light straight run naphtha.

3. The method of claim 1, wherein the steam is co-fed with the naphtha feedstock.

4. The method of claim 1, wherein the phosphorus modified Ti-containing HZSM-5 has a $Si/Al_2$ ratio of about 27 to about 30.

5. The method of claim 1, wherein coke deposits on a spent catalyst 6 hours after first feeding the naphtha feedstock and the steam to the reactor comprise less than about 5 percent by weight based on the weight of the spent catalyst, wherein the spent catalyst comprises the catalyst and the coke deposits.

6. The method of claim 1, wherein the catalyst is not steamed prior to feeding the naphtha feedstock to the reactor.

7. A method for producing ethylene and propylene from catalytic steam cracking of naphtha, the method comprising:
(a) providing a naphtha feedstock;
(b) providing steam;
(c) providing a catalyst consisting of phosphorus modified Ti-containing HZSM-5;
(d) feeding the naphtha feedstock and the steam to a reactor comprising the catalyst, thereby producing an effluent comprising ethylene and propylene; and
(e) removing the effluent from the reactor, the effluent having a combined yield of ethylene and propylene greater than about 45 percent by weight;
wherein the catalyst comprises from 1.0 to 10.0 percent by weight $P_2O_5$, and
wherein the catalyst is prepared by titanium modification followed by phosphorus modification.

8. The method of claim 7, wherein the phosphorus modification uses mono-ammonium phosphate.

9. The method of claim 7, wherein the naphtha feedstock comprises light straight run naphtha.

10. The method of claim 7, wherein the steam is co-fed with the naphtha feedstock.

11. The method of claim 7, wherein the phosphorus modified Ti-containing HZSM-5 has a $Si/Al_2$ ratio of about 27 to about 30.

12. The method of claim 7, wherein the catalyst comprises from about 1.0 to about 5.0 percent by weight Ti.

13. The method of claim 7, wherein the catalyst is prepared by titanium modification followed by phosphorus modification.

14. The method of claim 13, wherein the phosphorus modification uses mono-ammonium phosphate.

15. The method of claim 7, wherein coke deposits on a spent catalyst 6 hours after first feeding the naphtha feedstock and the steam to the reactor comprise less than about 5 percent by weight based on the weight of the spent catalyst, wherein the spent catalyst comprises the catalyst and the coke deposits.

16. A method for producing ethylene and propylene from catalytic steam cracking of naphtha, the method comprising:
(a) providing a naphtha feedstock;
(b) providing steam;
(c) providing a catalyst consisting of phosphorus modified Ti-containing HZSM-5;
(d) feeding the naphtha feedstock and the steam to a reactor comprising the catalyst, thereby producing an effluent comprising ethylene and propylene; and
(e) removing the effluent from the reactor, the effluent having a combined yield of ethylene and propylene greater than about 45 percent by weight.

* * * * *